July 14, 1959
L. P. FLATLAND
2,894,325
SELF-CONTAINED DENTAL HANDPIECE
Filed April 26, 1957
2 Sheets-Sheet 1
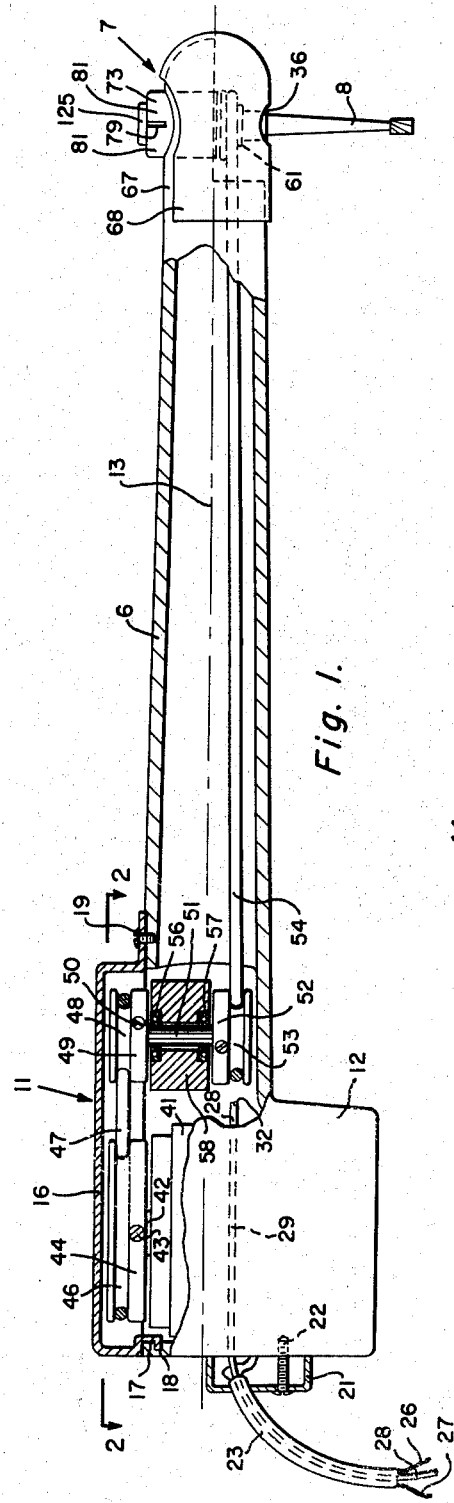
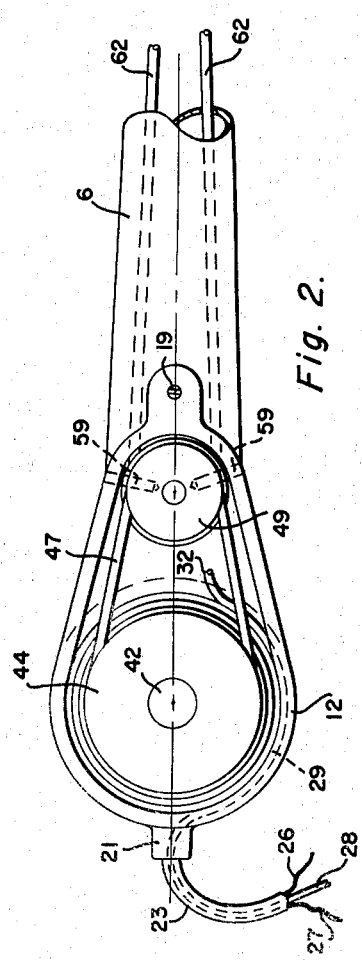
INVENTOR.
LLOYD P. FLATLAND
BY *Lothrop & West*
ATTORNEYS

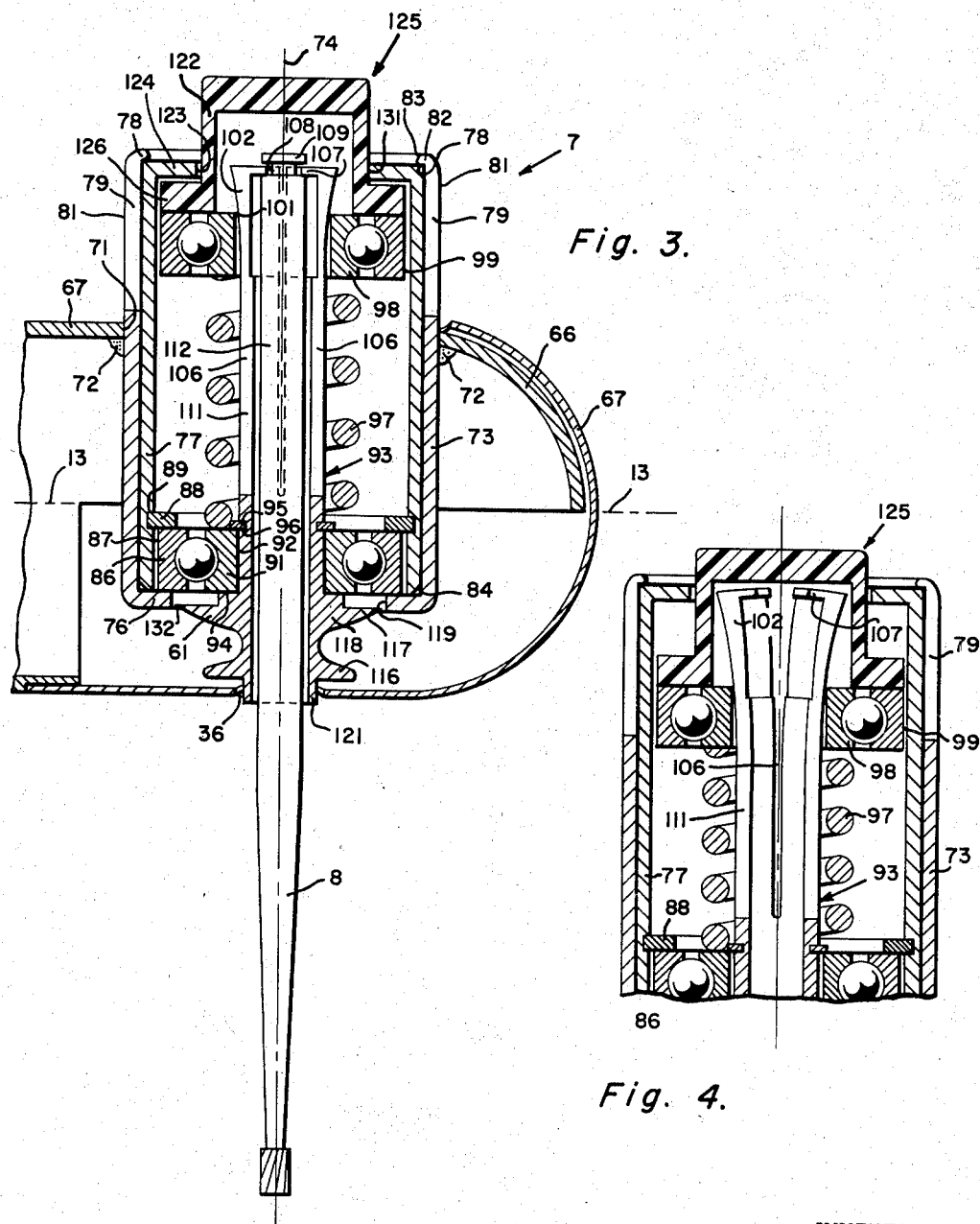

United States Patent Office 2,894,325
Patented July 14, 1959

2,894,325

SELF-CONTAINED DENTAL HANDPIECE

Lloyd P. Flatland, San Francisco, Calif.

Application April 26, 1957, Serial No. 655,349

1 Claim. (Cl. 32—27)

The invention relates to dental handpieces and more particularly to dental handpieces of the high speed type.

As exemplified by my co-pending patent application, Serial Number 621,760, filed November 13, 1956, there has been a continuing advance in the art within the latter recent years in respect of very high velocity dental handpiece and angle handpiece units. The attempt to reach high speeds has resulted from the recent introduction into the dental art of dental instruments provided adjacent the cutting area with carbide, diamond or other extremely hard materials. Velocities well in excess of 100,000 revolutions per minute are necessary to realize the maximum advantages to be gained from these new materials, and, as a result, numerous devices have been developed which purport to generate these high speeds without undue risk of harm to the patient and doctor.

Attempts heretofore have been made in the direction of speed multiplying units affixed to the dental handpiece sheath, the multiplying units deriving their motive power from the customary dental unit cord. Such construction resulted in many cases in undue frictional drag and, so far as is known, all such units have required that the dental unit cord be affixed to the handpiece in conventional fashion and which thus limits to considerable degree the freedom of use of the handpiece in the doctor's hand.

It is therefore an object of the invention to provide a dental handpiece which is completely self-powered or self-contained with the exception of a small and highly flexible electrical conductor which serves as a current lead-in.

It is another object of the invention to provide a highly manipulable dental handpiece free from the restrictions of the customary dental unit cord and other impedimenta.

It is still another object of the invention to provide a small and well-balanced handpiece which can be grasped by the dentist and turned to any angle or inclination without fear of cord entanglement and substantially without limitation as to the degrees of arc through which the handpiece can be rotated about its longitudinal axis.

It is a further object of the invention to provide a dental handpiece having a replaceable dental instrument rotating unit which can be quickly changed and which is especially adaptable for very high rotational velocities.

It is still a further object of the invention to provide a dental handpiece which is substantially sealed against the entry of undesirable extraneous matter and which therefore leads to a longer-lived device.

It is yet a further object of the invention to provide a dental handpiece which is safe in operation for doctor and patient alike.

It is still another object of the invention to provide a generally improved dental handpiece.

Other objects together with the foregoing are attained in the embodiment described in the following description and shown in the accompanying drawings in which Figure 1 is a side elevation of the handpiece, a portion thereof being shown in section to show the interior mechanism.

Figure 2 is a section of a portion of the rear end of the hand piece, the plane of section being indicated by the line 2—2 in Figure 1.

Figure 3 is a median vertical section to an enlarged scale of the dental instrument rotating unit showing a dental instrument securely mounted therein.

Figure 4 is a view comparable to Figure 3 but with the release button in depressed or unlocked position and with the dental instrument removed.

While the self-contained dental handpiece of my invention is susceptible of numerous physical embodiments depending upon the particular environment and requirements of use a considerable number of the herein shown and described devices have been made, sold and used by the dental profession, and have performed in a most satisfactory way.

In common with customary handpieces a sheath 6 has mounted at its forward end mechanism 7 for holding and rotating a dental instrument 8 such as a burr or mounted point.

Adjacent the rear-end of the sheath is mounted a housing, generally designated by the numeral 11, and comprising a substantially cylindrical housing portion 12 having a central axis substantially normal to the longitudinal axis 13 of the sheath. The cylindrical housing portion 12 may, for convenience, be termed a lower housing, whereas a casing 16, affixed to the upper end of the housing 12, may be termed an upper housing. The upper housing 16 is provided adjacent its rear half with a recurved flange 17 adapted to engage with a corresponding slot 18 formed in the housing 12. The forward end of the upper housing 16 is secured to the sheath 6 by an appropriate fastening such as a screw 19. For the purpose of keeping the interior of the housing and the sheath substantially airtight it is necessary that there be a close fit between the housings 12 and 16 and the sheath 6, gaskets (not shown) being sometimes used to effect this result where necessary.

Projecting rearwardly from the lower housing 12 is an auxiliary housing 21 secured to the housing as by a fastening 22 and serving as an entry-way for a tube 23 interiorly conducting a pair of electrical conductors 26 and 27 as well as an air-supply tube 28, the air-supply tube 28 being led through an air-supply tube channel 29 formed in the periphery of the lower housing 12 the tube 28 terminating at a location designated by the numeral 32.

Since a supply of air is led under pressure through the air supply tube 28 and is discharged into the housing and sheath at the point 32, the interior of the housing as well as the sheath is kept under an air pressure in excess of atmospheric pressure. The only major point of exit for the air is through an aperture 36 surrounding the dental instrument 8. Thus a continual outward flow or discharge of air is maintained around the periphery of the dental instrument 8 and, consequently, deleterious matter such as the material from the cutting of a tooth or from material used to clean teeth is prevented from entering. In other words, the mechanism within the sheath and housing and within the dental instrument rotating unit are kept bathed in a clean flow of air and thus have a life well in excess of the customary units which are continually attacked by the harmful and gritty material as well as fluid substances frequently encountered in the use of dental handpieces.

Located within the housing 12 is a power unit 41, preferably an electric motor of very small size but with a normal rotational velocity of the order of 45,000 r.p.m. under no load and 25,000 r.p.m. under average load condition, such units being commercially obtainable.

Projecting exteriorly from the upper end of the electric motor 41 is a shaft 42 to which is secured, as by a set screw 43, a pulley 44 provided with the customary groove 46 about which is reaved a transmitting element 47 such as an O-ring belt. The O-ring is likewise reaved about a groove 48 in a pulley 49 secured as by a set screw 50 to a shaft 51 having secured thereto, or made integral therewith, at its lower end a lower pulley 52 provided with a groove 53 in which is reaved a transmitting element 54 such as a belt, or an O-ring, or cord.

The shaft 51 is freely rotatable within yet is firmly supported by a pair of anti-friction bearings 56 and 57 mounted within corresponding shoulders in a bushing 58 secured to the sheath walls as by machine screws 59.

A diameter ratio of the pulley 44 and the pulley 49 is so selected as to cause a high angular velocity multiplication to occur, and, as appears in Figure 2 most clearly, the multiplication factor is approximately five, the diameter of the pulley 46 being appropriately adjusted with respect to the diameter of the pulley 48. Consequently if the electric motor shaft is rotated at an angular velocity of 25,000 r.p.m. then the rotational velocity of the shaft 51 approaches 125,000 r.p.m.

In the event it is desired to rotate the dental instrument 8 at a higher speed than the velocity attained by the pulley 52, the diameter of a pulley 61 in the instrument rotating unit 7 is reduced accordingly, the O-ring belt 54, or cord, being utilized to transmit the power available at the pulley 52 to the pulley 61.

As most clearly appears in Figures 1 and 3, the forward end of the converging sheath is configured to produce a nose 66, or overhang, while the portion of the sheath adjacent the nose 66 but rearwardly therefrom is shaped to circular cylindrical form, for convenience termed, a barrel portion 67 to permit the mounting thereon of a guard 68. The guard 68 is in tight engagement with the enclosed barrel portion 67 of the sheath although the guard 68 can be removed therefrom by strong finger force exerted longitudinally on the guard, the instrument 8 being of course previously removed. As a result of the close fit, airtightness is retained and thus the pressurized air within the housing and the sheath is forcibly discharged outwardly only through the aperture 36 at the bottom of the guard, the exhausting air serving as an effective curtain to prevent access of fluids and other unwanted susbstances in the vicinity of the dental instrument 8.

The dental instrument rotating unit 7 is disposed within a circular opening 71 formed in the forward upper portion of the sheath barrel 67 and is secured thereto in an air tight and sturdy fashion as by solder 72. The unit 7 is especially well adapted for the ultra-high velocities encountered herein and it provides the user, furthermore, with a mechanism which at once holds the dental instrument in positive, safe fashion yet permits rapid change of instruments when required.

The unit 7 comprises an outer housing 73 affixed to the sheath barrel 66 with the housing axis 74 normal to and in intersecting relation with the sheath axis 13. Adjacent the lower end of the housing, as appears in Figure 3, a portion is in-turned to form an annular shoulder 76 adapted to support a sleeve 77 encompassed by the housing 73 and resiliently retained in position within the housing by a chamfer 78 formed in the upper margin of the housing. Four equally spaced slots 79 in the upper housing perimeter provide four corresponding fingers 81 terminating in tips 82 slightly chamfered as at 83. The bottom of the sleeve 77 is itself beveled as at 84. Thus, the sleeve 77 is assembled into the housing by pressing downwardly on the sleeve with the sleeve bevel 84 in contact with the housing finger tip chamfer 83, the sleeve bevel 84 camming outwardly the four housing fingers 81 far enough to permit insertion of the sleeve and seating of the sleeve against the lower housing shoulder 76. As seating is effected, simultaneous snapping inwardly of the housing fingers occurs, and thus confining the sleeve as appears in Figures 3 and 4.

Encompassed by the housing 77 and likewise seated against the sleeve shoulder 76 is the outer race 86 of a lower antifriction bearing 87, the outer bearing race 86 being confined from above by a split annular ring 88 seated within an annular cavity 89 in the sleeve inner wall. The inner race 91 of the bearing 87 is preferably in light interference fit with a cylindrical wall portion 92 of a collet, generally designated 93, the lower end of the inner race 91 being supported by a shoulder 94 formed in the collet and the upper end of the race being held by a split annular ring 95 disposed within an annular cavity 96 in the collet wall.

The split ring not only serves to confine the inner race 91 but it also acts as a positioner or centering element for a helical compression spring 87 interposed between the inner race 91 of the lower bearing 87 and an inner race 98 of an upper anti-friction bearing 99 having an outer race 100 in spaced relation with respect to the surrounding sleeve 77.

The spring 97 urges the upper bearing in an upward direction, the upper inner margin 101 of the inner race 98 bearing against the adjacent tapered surfaces of a plurality of collet jaws 102 and camming or urging inwardly said jaws against the outwardly tending springiness built into the jaws by deformation thereof, the jaws normally assuming the spreading attitude shown to somewhat exaggerated scale in Figure 4. A plurality of longitudinal slots 106 in the collet walls or collet tube produces the intervening plurality of collet jaws 102.

The upper ends of each of the jaws are inturned to form teeth 107 which project radially inwardly a part of the way into an annular slot 108 encountered in most dental instruments, the slot 108 ordinarily being surmounted by a cap 109, the teeth effectively preventing, in their closed position, any longitudinal movement of the instrument 8.

The central portion 111 of the jaws confine the adjacent walls of the instrument shank 112 when the jaws are in the closed position shown in Figure 3 and exert the torque of the collet against the instrument 8. In turn, the collet is rotated by rotation of the pulley 61, as previously described, the pulley 61 preferably being formed integrally with the collet. While the lower cheek 116 of the pulley 61 is of conventional shape, it has been found that by extending a flange 117 outwardly on the upper cheek 118 so that the flange 117 substantially covers the opening 119, formed by the housing shoulders 76, a maximum amount of protection against entry of unwanted substances into the interor of the rotating unit is obtained.

For a similar reason, a collar 121 is provided at the lower end of the pulley cheek 116 and thus serves to minimize the entry of outside foreign matter through the aperture 36.

Means are provided for quickly releasing the clamping jaws from their hold on the instrument shank and for retracting the teeth 107 from their longitudinal instrument confining effect. A button 125 is mounted adjacent the top end of the instrument rotating unit 7, the button including a hollow boss 122 projecting upwardly through an opening 123 between a circular shoulder 124 formed by in-turning the upper end of the sleeve 77. The lower end of the boss is out-turned to form a flange 126 underlying the shoulder 124, the shoulder 124 thereby preventing ejection, by the helical spring 97, of the button 121. The lower surface 126 of the flange bears against the upper surface of the upper bearing 99; and, consequently, when the button 121 is depressed, as by the user's finger, against the upward urgency of the spring 97, the upper bearing 99 is depressed. The natural resiliency of the collet jaws thereupon causes them to spring to open position, as indicated in Figure 4 and thereby permitting removed downwardly of the dental instrument 8. A different instrument may thereupon be inserted by the dentist, while keeping the button depressed, if desired, and, upon feeling the instrument cap 109 abut against the button, the button can be released. The spring then urges the upper bearing and button upwardly, the collet jaws and collet teeth again being cammed into gripping attitude.

In addition to the numerous other advantages of the self-contained hand-piece of the invention, including the continuous air-flow or air-curtain formed about the lower aperture 36, it will also be noted that a very slight but effective upward air-flow occurs within the instrument rotating unit 7, the air discharging through the small annular opening 131 between the button boss 122 and the sleeve shoulder 124. A fraction of the air within the sheath, in other words, moves upwardly through the aperture 132 between the periphery of the pulley cheek flange 117 and the adjacent housing shoulder 76, the air thereupon percolating upwardly through the cage of the lower bearing, upwardly and around the outside of the upper bearing and button shoe 126 and exiting through the opening 131. In this fashion any undue heat developed within the rotating unit, or heat generated at the cutting tip of the instrument and conducted into the instrument shank, and thus into the collet, is carried away. Furthermore, the outward air flow around the button, even though slight compared to the air discharge through the lower aperture 36 prevents ingress of particles of grit and other undesirable substances.

What is claimed is:

A self-contained dental handpiece comprising an elongated sheath tapered from a rear end to a forward end, a cylindrical housing mounted on one side of said rear end of said sheath, the axis of said housing being substantially perpendicular to the axis of said sheath, an electric motor disposed in said housing, the axis of rotation of said motor being substantially coincident with the axis of said housing, a first pulley mounted on the shaft of said motor, a dental instrument rotating unit mounted on said forward end of said sheath, the axis of rotation of said unit being parallel to the axis of rotation of said motor, said unit including a central rotatable collet terminating at an opening in said sheath said opening being located on the same side of said sheath as said housing, said collet including a second pulley integrally formed therewith, an intermediate pair of pulleys rotatably mounted in said sheath, said pair of pulleys being rotatable about an axis parallel to the axes of rotation of said motor shaft and said collet and lying in substantially the same plane as the plane of said axes, a first belt connecting said first pulley and one of said pair of pulleys, a second belt connecting said second pulley and the other of said pair of pulleys, means for covering said rearward end of said sheath, and means for maintaining the interior of said sheath at a pressure greater than atmospheric, said opening adjacent said collet forming substantially the only exit for the air within said sheath.

References Cited in the file of this patent
UNITED STATES PATENTS

| | | |
|---|---|---|
| 412,616 | Hess | Oct. 8, 1889 |
| 950,759 | Weiner | Mar. 1, 1910 |
| 2,078,859 | Lapham | Apr. 27, 1937 |
| 2,442,033 | Brantly et al. | May 25, 1948 |